United States Patent [19]

Stehning

[11] Patent Number: 4,526,764

[45] Date of Patent: Jul. 2, 1985

[54] SCRUBBER OPERATING METHOD FOR THE DESULFURIZATION OF FLUE GASES

[75] Inventor: Werner Stehning, Dorsten, Fed. Rep. of Germany

[73] Assignee: Gottfried Bischoff Bau kompl. Gasreinigungs- und Wasserrückkühlanlagen GmbH & Co. Kommanditgesellschaft, Essen, Fed. Rep. of Germany

[21] Appl. No.: 580,645

[22] Filed: Feb. 16, 1984

Related U.S. Application Data

[62] Division of Ser. No. 515,919, Jul. 20, 1983.

[30] Foreign Application Priority Data

Jul. 21, 1982 [DE] Fed. Rep. of Germany ....... 3227187

[51] Int. Cl.$^3$ ............................................. C01B 17/00
[52] U.S. Cl. ...................................... 423/242; 423/166
[58] Field of Search .......... 423/242 A, 242 R, 244 A, 423/244 R, 166

[56] References Cited

U.S. PATENT DOCUMENTS

| | | | |
|---|---|---|---|
| 3,808,321 | 4/1974 | Fukui et al. | 423/242 |
| 4,047,891 | 9/1977 | Schuetz | 423/242 |
| 4,102,303 | 7/1978 | Cordier et al. | 118/326 |
| 4,366,132 | 12/1982 | Holter et al. | 423/242 |
| 4,427,553 | 1/1984 | Fore | 210/743 |
| 4,431,608 | 2/1984 | Katagiri et al. | 422/170 |

*Primary Examiner*—Gregory A. Heller
*Attorney, Agent, or Firm*—Karl F. Ross; Herbert Dubno

[57] ABSTRACT

A scrubber is provided with a grate in its sump through which oxygen is introduced to separate the oxidation zone above this grate from a reaction zone below the grate, a calcium containing additive being introduced into this reaction zone. Flue gas to be desulfurized is passed through a washing zone above the sump and there contacted with normally circulating scrubbing liquid containing the additive to absorb sulfur dioxide and sulfur trioxide. The sulfur dioxide is oxidized to sulfur trioxide and the additive induces precipitation of calcium sulfate in the sump. After a prolonged standstill, settled solids in the sump are induced into movement by drawing a portion of the sump liquid from an upper part thereof and injecting it into a lower part of the sump.

1 Claim, 6 Drawing Figures

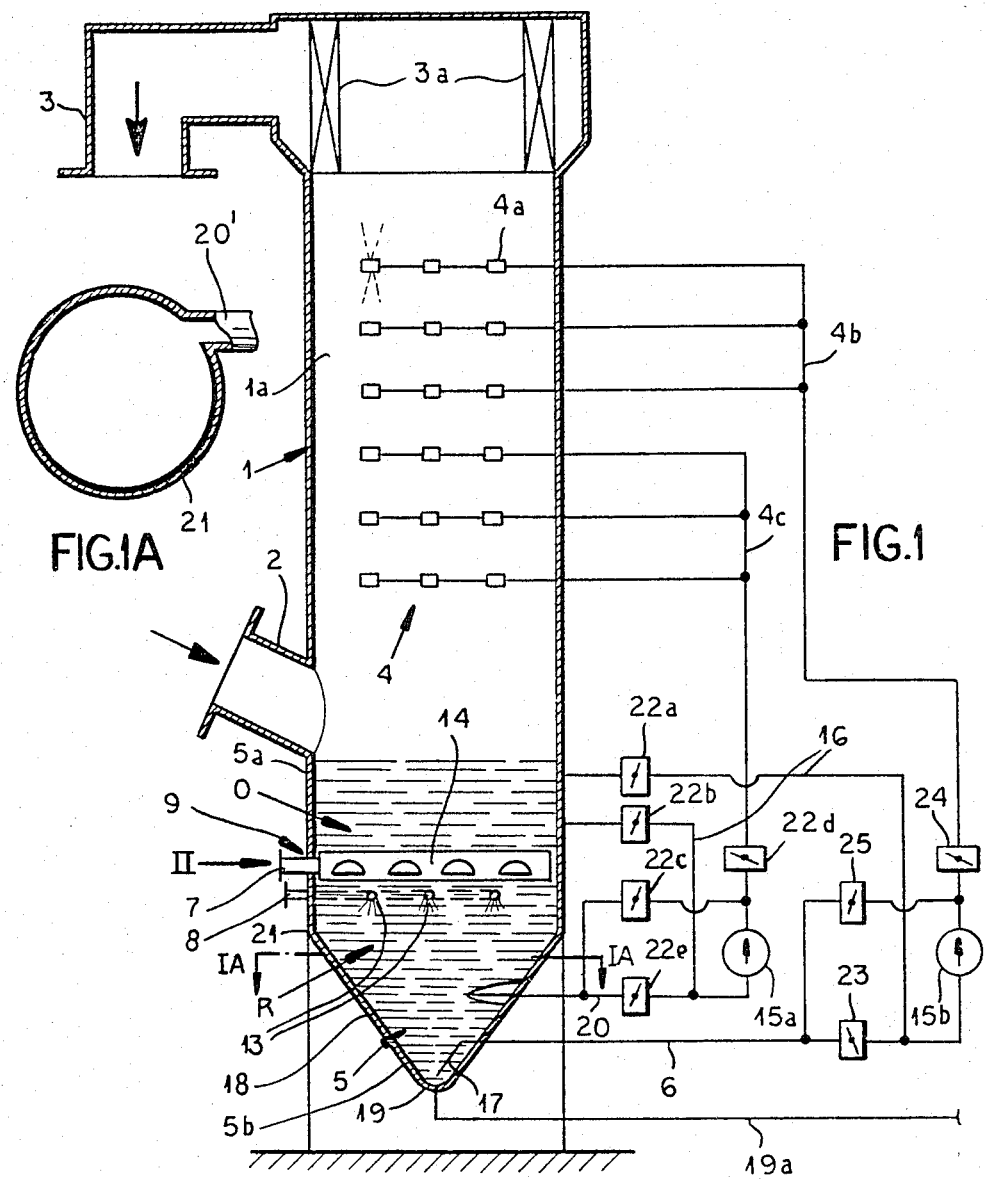
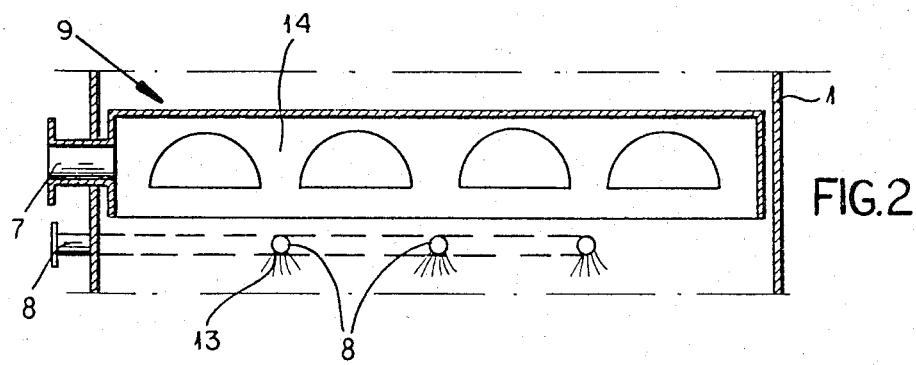

SCRUBBER OPERATING METHOD FOR THE DESULFURIZATION OF FLUE GASES

This application is a division of application Ser. No. 515,919 filed July 20, 1983.

CROSS REFERENCE TO RELATED APPLICATIONS

This application is related to the commonly assigned copending application Ser. No. 493,984 filed May 12, 1983 entitled SCRUBBER FOR THE DESULFURIZATION OF EXHAUST GASES.

FIELD OF THE INVENTION

Our present invention relates to a washing tower or column for removing sulfur-containing compounds, especially sulfur dioxide and sulfur trioxide, from flue gases, especially flue gases from the combustion chamber of a power plant boiler. More particularly, the invention relates to a scrubber for the desulfurization of such flue gases before they are discharged into the atmosphere and to a method of operating an improved scrubber and/or to a method of desulfurizing flue gases.

BACKGROUND OF THE INVENTION

As explained in the aforementioned copending application, it is known that the release of sulfur-containing combustion products from power plant boiler combustion chambers or like industrial combustion systems, primarily as a result of the combustion of the high sulfur fuels utilized with increasing frequency, is detrimental to the environment and to the health of inhabitants of areas surrounding the power plant and may even adversely affect the environment at locations quite distal therefrom.

For this reason scrubbers have been developed for the desulfurization of such flue gases which can have a flue gas inlet, a flue gas outlet, means between the inlet and the outlet for treating the flue gas with a scrubbing solution which can contain one or more substances capable of binding the sulfur compounds, a sump below the washing zone for collecting the scrubbing liquid which can contain, in addition to the sulfur compounds, particulates scrubbed from the flue gas and other substances soluble in or absorbed by the scrubbing liquid and means for introducing oxygen into the sump and also for introducing additives to the sump.

The purpose of introducing oxygen into the sump is to oxidize any sulfite in the scrubbing liquid to sulfate, thereby allowing the recovery of calcium sulfate as a solid product (gypsum) for use in the construction industry.

The scrubbing liquid decanted from the precipitate solids may be recirculated and can include part of the soluble compounds formed as a product and which therefore may be prevented from sedimenting out. The additives which are fed to the scrubbing water can include lime, limestone and other calcium containing compounds as described in the aforementioned application which ensure that the sulfate when and if it is formed and when and if it is precipitated, will precipitate out as calcium sulfate.

To avoid the deposition of gypsum on the scrubber walls and baffles or other formations within the scrubber, the scrubbing liquid is operated with a calcium sulfate content of about 20 to 150 grams per liter, i.e. a relatively high concentration.

This high gypsum content ensures precipitation of the gypsum in the sump of the scrubber both during operation and when, for some reason, the system is brought to standstill, i.e. recirculation of the scrubbing liquid is terminated.

Conventional scrubbers are provided with numerous mechanical stirrers or agitators designed to prevent precipitation of the solids at various locations at which such precipitation is not desired.

This, of course, is disadvantageous since such stirrers and agitators require considerable maintenance, introduce significant downtime possibilities and create high capital, energy and other operating costs.

In addition, they generally require passages through the walls of the scrubber which must be sealed and the seals have maintenance and like problems.

Indeed, should one or more of the agitators somehow fail, the locations at which such agitators are provided generally are prone to relatively dense packing of precipitated solids which make it difficult, if not impossible, to restart the agitator, thereby aggravating the problem still further.

Finally, the operation of such scrubbers requires a standby source of emergency power to operate the agitators even when the main power supply fails either to keep the agitators working or to remove the liquid with its high gypsum content so that undesired deposit of solids does not occur.

The removal itself has the disadvantage that on restarting of the apparatus it is necessary to build up the concentration of gypsum again in the scrubbing liquid and hence the most desired mode of operation is one which retains the scrubbing liquid in the scrubber.

OBJECTS OF THE INVENTION

It is the principal object of the present invention to provide an improved scrubber for the purposes described which is free from the disadvantages enumerated above.

Another object of this invention is to provide a scrubber for the desulfurization of flue gas which does not require multiple mechanical stirrers or agitators with the ensuing disadvantages, which allows a scrubbing liquid with a high concentration of gypsum to be retained in the scrubber and which permits restarting of the system without difficulty after a period of downtime resulting from power failure or some other cause.

It is also an object of this invention to provide an improved method of operating a scrubber and/or a method of scrubbing sulfur-containing compounds from flue gases whereby earlier disadvantages are avoided.

Yet another object of this invention is to provide an improved scrubber which extends the principles set forth in the copending application mentioned previously.

SUMMARY OF THE INVENTION

These objects and others will become apparent hereinafter are attained, in accordance with the present invention which provides a scrubber of the aforementioned type, i.e. having an upper washing zone traversed by the flue gases and into which the scrubbing liquid is fed, a sump for collecting this liquid below this zone, means for introducing oxygen into the liquid to effect an oxidation reaction converting sulfite to sulfate, for example, and means for introducing an additive to this zone in order to precipitate out calcium sulfate in a solid product, the slurry being withdrawn at the bottom of the sump. According to the invention, the means for recirculating scrubbing liquid from the sump to the washing zone includes backwashing means, i.e. means for introducing the scrubbing liquid into the sump so as to agitate the solids therein, reform the flowable mixture and reestablish scrubbing conditions in the event of a shutdown.

More particularly, a backwashing system is provided which comprises at least one intake pipe opening into the sump at an upper portion thereof, i.e. a portion of the sump above that in which solids will settle and usually containing liquid free from solids, although at a high solids concentration in solution, a pump connected to this conduit, and at least one discharge conduit opening into a lower portion of the sump for introducing the liquid pumped from the upper portion thereof into this lower portion to create the stirring action previously described.

Preferably the scrubbing column is provided with a grate arrangement which partitions the sump into an upper oxidation zone and a lower reaction zone, the grate being formed by downwardly open mutually parallel and transversely spaced hoods or channels into which the oxygen is introduced either as pure oxygen or as technical grade oxygen or a gas-containing oxygen such as air.

The spacing between the grate members is sufficiently small to obstruct any backflow upwardly from the reaction zone into the reduction zone and the channels can be provided with upwardly directed perforations to induce oxygen upwardly into the oxidation zone.

In the best mode operation, gas cushions are maintained in these channels with the oxygen passing upwardly only through the orifices, the calcium containing additive is fed through pipes at nozzles oriented downwardly at the gaps between the grate members, and the intake conduit for the backwashing system communicates with the oxidations with the liquids in the oxidation zone above the grate, but the discharge conduit opens into the sump below this grate.

The details of the grate and its relationship to the means for introducing the additive and the oxidation and reduction zones are fully set out in the above mentioned application.

Because of the interaction between the backwashing system and the grate, especially intensive agitation and stirring can be generated in the reaction region below the grate, ensuring full interaction of the additive with the phases below the grate so that as such interaction occurs precipitation of solids is more efficient and incorporation of the additive in the fluid is likewise rendered more effective.

The backwashing means can advantageously be provided with at least one discharge duct which opens within the sump and is trained upon the apex thereof, this sump being formed with a conically converging bottom having its apex at the lowest point at which the slurry is withdrawn. Alternatively or in addition, a backwashing pipe can open into the sump generally tangentially close to the base of the cone formed by the bottom. When two such outlets are provided, each can be connected to the discharging side of a respective pump having its intake side connected to a conduit which communicates with the oxidation zone.

The system of the invention has been found to be highly advantageous since it eliminates the need for mechanical stirrers and the problems discussed above which are associated with them. By simple backwashing, any precipitated solids can be set into motion to allow full operation without delay and, since the decantate from the sump can be recirculated with full solids concentration to the washing zone, immediate commencement of the scrubbing operation is ensured and there is no need to withdraw the contents of the sump from the column in the event of shutdown.

BRIEF DESCRIPTION OF THE DRAWING

The above and other objects, features and advantages of the present invention will become more readily apparent from the following description, reference being made to the accompanying drawing in which:

FIG. 1 is a vertical section diagrammatically illustrating a scrubbing column according to the invention, the backwashing system being shown in highly diagrammatic form;

FIG. 1a is a section taken along the line Ia—Ia in FIG. 1;

FIG. 2 is a section drawn to a larger scale of the region II of FIG. 1;

SPECIFIC DESCRIPTION

Figure 3:
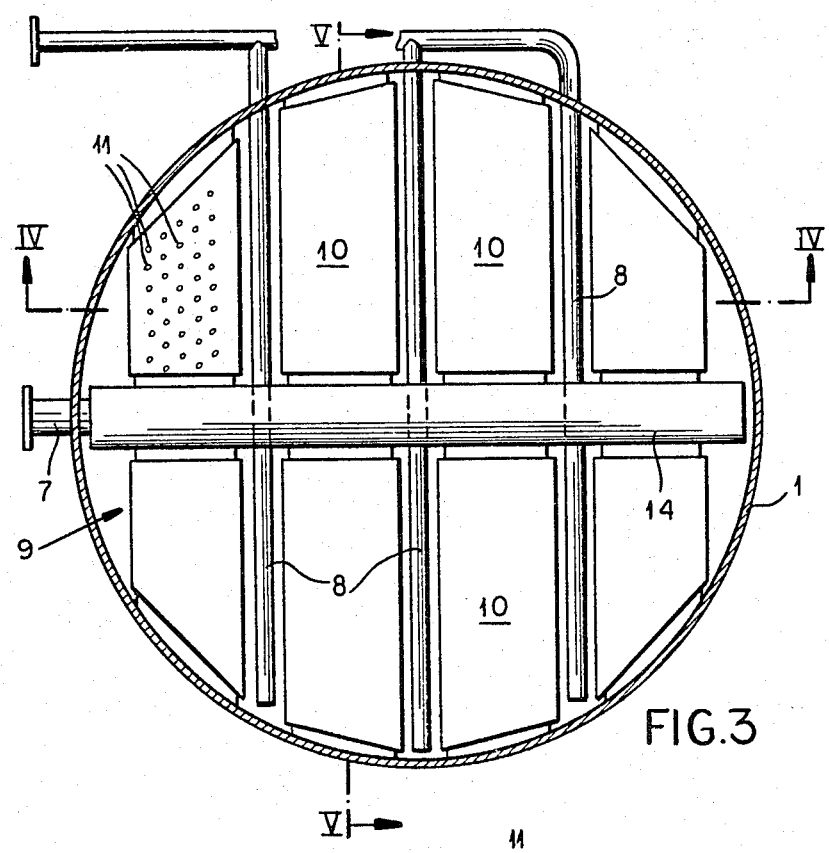
FIG. 3 is a horizontal section taken above the grate in FIG. 1 looking downwardly and hence containing the grate in plan view, also highly diagrammatically.
Figure 4:
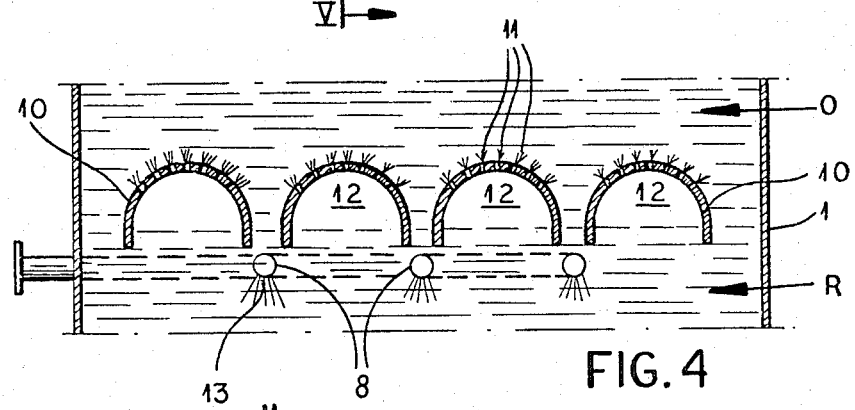
FIG. 4 is a section taken along the line IV—IV of FIG. 3.
Figure 5:
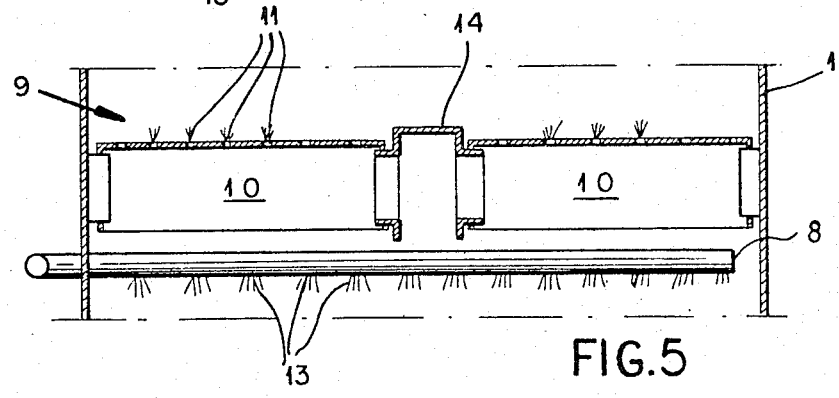
FIG. 5 is a section taken along the line V—V of FIG. 3.

In FIG. 1 I have shown a scrubbing tower 1 of an apparatus for the desulfurization of a flue gas which can be provided downstream of the combustion chamber of a boiler, especially a power plant boiler which requires firing with high sulfur fuel.

The scrubbing column 1 has a flue gas inlet 2 opening into the column at the lower end of a washing zone 1a which is fitted with a multiplicity of spray heads 4a connected in groups, disposed at different levels and supplied by two scrubbing liquid manifolds 4b and 4c forming part of the washing means 4 for the zone 1a.

At the upper end of the zone, i.e. at the top of the column, there is provided a flue gas outlet 3 which can open into a further cleaning plant, if necessary, or into a stack for release of the flue gases into the atmosphere. Droplet separators 3a of a conventional design may be provided to intercept entrained scrubbing liquid.

The flue gas is thus passed through the zone 1a between the inlet 2 and the outlet 3.

The tower has a sump 5 below the zone 1a, this sump 5 comprising a cylindrical portion 5a below the inlet 2 and a downwardly converging conical portion 5b running to an apex 19 from which a pipe 19a can draw the sump product, generally a slurry in which the solids are primarily gypsum.

The apparatus includes, as well, a means represented at 7 for feeding oxygen to the liquid in the sump and a means represented at 8 for introducing additives to the sump liquid.

The scrubbing column operates above the liquid level in the sump as an absorption unit in which the scrubbing liquid, which can consist essentially of lime water, is contacted with the flue gases and absorbs the sulfur dioxide and sulfur trioxide therefrom, the liquid collecting in the sump from which the sump product in the form of a slurry of calcium sulfide and calcium sulfate is withdrawn.

It is known to maintain the sump product in suspension by providing a circulation which maintains the gypsum in suspension and further to provide a recycling system whereby, for example, pumps 15a and 15b supply the manifolds 4b and 4c with the scrubbing liquid which is withdrawn from the liquid sump.

For the reasons set forth above and in greater detail in the above mentioned copending application, the oxygen supply means 7 is advantageously formed as a horizontal grate 9 of oxygen supply ducts 10 such that the grate subdivides the sump into an oxidation zone O above the grate and a reduction zone R below the grate.

Below the grate 9, the device 8 for introducing the additive, e.g. lime water, into the sump opens at nozzles 13 which are directed downwardly and are disposed directly beneath the gaps 14 between the oxygen supply ducts.

The ducts 10 are downwardly open hoods or channels and are formed with upwardly directed orifices 11 enabling oxygen to pass into the liquid layer overlying the grate.

The distance between the ducts 10 is dimensioned so that a backflow from the reaction zone R to the oxidation zone O is restricted. In the ducts 10, oxidation cushions 12 are maintained so that the scrubbing liquid from the oxidation zone cannot trickle through the orifices 11 into the reaction zone R.

In the scrubber most of the sulfur dioxide which is absorbed in the scrubbing liquid is oxidized in the oxidation zone to the sulfate. This oxidation is effected usually at acid pH, i.e. a pH below 7 and preferably around 4 to 6.5. The acidity is contributed by the acid gases absorbed from the flue gas.

In the reaction zone, the pH is raised by the additive, e.g. lime water, so that calcium sulfate in particulate form is produced and can be removed as described.

The grate 9 is so formed that it separates the oxidation zone from the reaction zone. For an effective separation, the ducts forming the grate must be large by comparison with the spaces between them. The downwardly flowing scrubbing liquid thus is accelerated through these gaps and backflow is largely avoided.

The oxygen bubbles released by the orifices 11 also agitate the liquid so that there is little tendency for deposits to form on the ducts and because the ducts are downwardly open, solids do not cake up with the ducts.

The air supply is effected through a central passage 14a which can be seen in FIG. 3. In a practical embodiment of the invention, the channels 10 have a width of about 1 meter while the spacing between them is 0.5 meter or less. Usually the additive is diluted with makeup water which will eventually be involved in the scrubbing circulation.

According to the invention, the pumps 15a and 15b can, in the event of the need to restart the scrubber after shutdown, be connected by valves 22a and 22b and line 16 at their intake sides to upper portions of the sump, i.e. portions which tend to remain clear as solids precipitate on shutdown.

One of these pumps is then connected by the open valve 25 (valves 23 and 24 being closed) to the backwashing pipe 17 which opens at the lowermost portion of the sump 5.

While it is possible to provide an intake for one of the pumps below the grate, preferably both intakes are located above the grate, i.e. in the oxidation zone.

The conical portion 5b has a converging bottom 18 terminating in the apex 19 and the pipe 17 is directed at this apex.

A further backwashing pipe 20 is shown to open tangentially at a midpoint along the height of the wall 18 and this pipe or an equivalent pipe 20' (see FIG. 1a), located at the region of the base 21 of the cone, can be connected to the outlet of the other pump 15a by a valve 22c, the valves 22d and 22e being closed.

The pumps 15a and 15b can be utilized for the customary recirculation of the scrubbing liquid by opening valves 23, 24, 22c and 22d and by closing valves 22a, 22b, 25 and 22c. Surprisingly, even after long standstills with gypsum deposits several meters in height, the backwashing system of the invention has been found to be successful in reestablishing proper operating conditions. Additional pumps and backwashing circulations can of course be used, once the system is in operation one or more of the pumps can be shutdown as long as at least one other pump remains functioning and, of course, the pumps can be dimensioned to have different flow rates depending upon requirements.

For startup, pump 15b can be energized, valve 22 opened, valve 23 closed, valve 24 closed and valve 25 opened. After agitation for a period of 1 to 5 minutes, valve 23 can be opened, valve 22 closed, valve 22 opened and valve 22 closed. The operation of 15a can be coordinated with that of pump 15b or offset therefrom. The apex angle of the bottom 5b of the sump is preferably 60°. When only one pump is used, the preferred backwash inlet is directed at the apex 19 while with a two-pump system, liquid is fed into the sump at the apex 19 and tangential at the base of the cone. For a three-pump system, two inlets can be directed at the apex and one tangential at the base of the cone or vice versa or an additional inlet can be provided at the intermediate location shown. The tangential inlet tends to set the sump contents in rotation which has been found to be especially effective for thorough mixing with the additive. In practice, the system has been found to be effective with standstill periods of a week and more.

I claim:

1. A method of operating a scrubber for the desulfurization of a flue gas wherein the flue gas is passed in direct contact with an aqueous calcium containing scrubbing liquid in a washing zone in the scrubber above a sump, and scrubbing liquid is collected in said sump, said method comprising the steps of:

introducing oxygen into the liquid in said sump so as to form an oxidation zone at an upper portion of the sump;

normally circulating scrubbing liquid from said sump to said washing zone; and after a standstill of said scrubber in which scrubbing liquid is retained in said sump and solids collect therein, withdrawing a portion of scrubbing liquid from an upper part of said sump and injecting the withdrawn portion of the scrubbing liquid into a lower part of said sump to entrain settled solids into movement, and thereafter restore the circulation of scrubbing liquid from said sump to said washing zone, the scrubbing liquid to be injected into said sump being withdrawn from said oxidation zone and being injected into said reaction zone, said oxygen being introduced into said sump through a grate at a location between said oxidation zone and said reduction zone; and restricting the downward flow of scrubbing liquid from said oxidation zone to said reduction zone at said location.

* * * * *